(12) United States Patent
O'Scolai et al.

(10) Patent No.: US 7,050,409 B1
(45) Date of Patent: *May 23, 2006

(54) WIRELESS T/E TRANSCEIVER FRAME AND SIGNALING CONTROLLER

(75) Inventors: Cathal O'Scolai, San Diego, CA (US);
Baya Hatim, San Diego, CA (US);
Joseph J. Roy, San Diego, CA (US);
Saeid Safavi, San Diego, CA (US);
Ismail Lakkis, San Diego, CA (US);
Hoang Xuan Bui, San Diego, CA (US);
Deirdre O'Shea, San Diego, CA (US);
Masood K. Tayebi, San Diego, CA (US)

(73) Assignee: Wireless Facilities, Inc., San Diego, CA (US)

(*) Notice: Subject to any disclaimer, the term of this patent is extended or adjusted under 35 U.S.C. 154(b) by 471 days.

This patent is subject to a terminal disclaimer.

(21) Appl. No.: 10/078,564

(22) Filed: Feb. 15, 2002

Related U.S. Application Data

(63) Continuation of application No. 08/970,729, filed on Nov. 14, 1997, now Pat. No. 6,370,158.

(51) Int. Cl.
*H04Q 7/00* (2006.01)
(52) U.S. Cl. .................... 370/329; 370/437
(58) Field of Classification Search ........... 370/503, 370/329, 341, 345, 392, 395.6, 412, 413, 370/415, 417, 419, 437, 465, 474, 496, 505, 370/506, 321, 334, 337, 339, 340, 347, 352, 370/442, 493, 494, 495, 468, 478
See application file for complete search history.

(56) References Cited

U.S. PATENT DOCUMENTS

| 4,471,480 A | 9/1984 | Haussmann et al. |
| 4,764,941 A | 8/1988 | Choi ..................... 375/112 |
| 4,860,283 A | 8/1989 | Takano et al. ............. 370/82 |
| 5,067,126 A | 11/1991 | Moore .................... 370/112 |
| 5,181,225 A | 1/1993 | Neeser et al. ............... 375/1 |
| 5,255,293 A | 10/1993 | Archer et al. ............ 375/372 |
| 5,287,389 A | 2/1994 | Ichibangase et al. ...... 375/365 |
| 5,373,502 A | 12/1994 | Turban ................... 370/18 |
| 5,434,905 A | 7/1995 | Maeda et al. ............ 370/350 |
| 5,511,068 A | 4/1996 | Sato ..................... 370/18 |

(Continued)

FOREIGN PATENT DOCUMENTS

GB    2 213 025 A    8/1989

(Continued)

OTHER PUBLICATIONS

Ruprecht, et al., IEEE, vol. 2, pp. 738-739, May 13, 1991, "Code Division Multiple Access: An Indoor Cellular System."

*Primary Examiner*—Phirin Sam
(74) *Attorney, Agent, or Firm*—Knobbe Martens Olson & Bear LLP

(57) ABSTRACT

A system and method providing a frame structure to received channel data sent over an air interface of a wireless communication system. The system and method may allow compensation for transmitting and receiving frequency variations, synchronization at the receiver, and provides a virtual signaling channel which may be used for system alarms and status. In one embodiment, the system uses bit stuffing, a frame preamble and a signaling preamble to transmit data at a high data rate in the ISM band.

34 Claims, 8 Drawing Sheets

U.S. PATENT DOCUMENTS

| | | | |
|---|---|---|---|
| 5,513,183 A | 4/1996 | Kay et al. | 370/337 |
| 5,533,013 A | 7/1996 | Leppanen | 370/18 |
| 5,546,381 A | 8/1996 | Fukushima | 370/18 |
| 5,555,247 A | 9/1996 | Matsuoka et al. | |
| 5,563,891 A | 10/1996 | Wang | 375/372 |
| 5,568,472 A | 10/1996 | Umeda et al. | 370/18 |
| 5,623,405 A * | 4/1997 | Isono | 705/30 |
| 5,661,778 A | 8/1997 | Hall et al. | 379/29 |
| 5,745,480 A | 4/1998 | Behtash et al. | 370/468 |
| 5,745,837 A | 4/1998 | Fuhrmann | 455/5.1 |
| 5,768,269 A | 6/1998 | Rakib et al. | 370/342 |
| 5,799,010 A | 8/1998 | Lomp et al. | 370/335 |
| 5,822,313 A | 10/1998 | Malek et al. | 370/332 |
| 5,878,045 A | 3/1999 | Timbs | 370/466 |
| 5,918,160 A | 6/1999 | Lysejko et al. | 455/425 |
| 5,930,477 A * | 7/1999 | Uchida | 709/236 |
| 5,930,704 A | 7/1999 | Kay | 455/419 |
| 5,991,308 A | 11/1999 | Fuhrmann et al. | 370/474 |
| 6,031,838 A * | 2/2000 | Okabe et al. | 370/395.6 |
| 6,049,535 A | 4/2000 | Ozukturk et al. | 370/335 |
| 6,052,365 A | 4/2000 | Bhagalia et al. | 370/336 |
| 6,175,560 B1 | 1/2001 | Bhagalia et al. | 370/342 |
| 6,185,207 B1 * | 2/2001 | LaBerge et al. | 370/392 |
| 6,314,097 B1 * | 11/2001 | Ohara | 370/392 |

FOREIGN PATENT DOCUMENTS

| | | |
|---|---|---|
| GB | 2 286 949 A | 8/1995 |

* cited by examiner

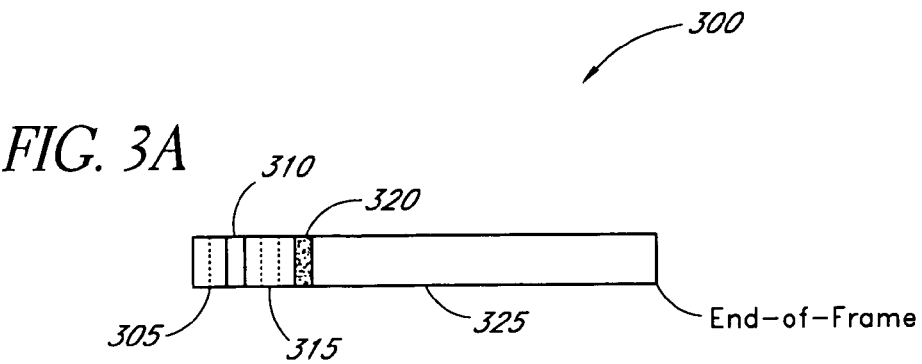
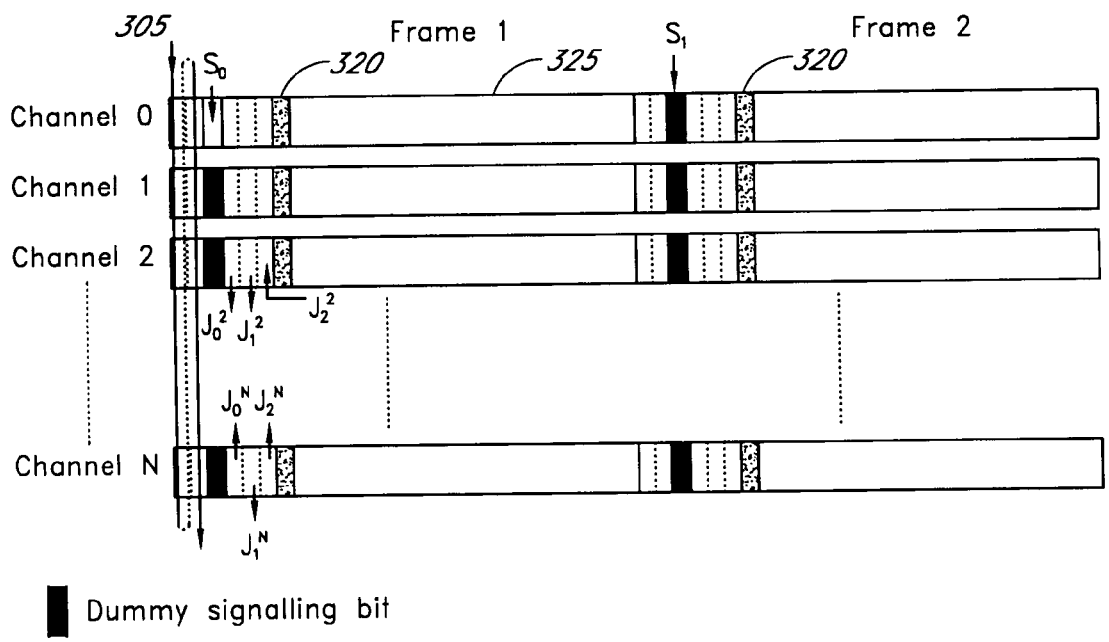

WIRELESS T/E TRANSCEIVER FRAME AND SIGNALING CONTROLLER

RELATED APPLICATIONS

The present application is a continuation of U.S. patent application Ser. No. 08/970,729, filed Nov. 14, 1997 now U.S. Pat. No. 6,370,158, titled identically as the present application, the entirety of which is hereby incorporated herein by reference.

BACKGROUND OF THE INVENTION

1. Field of the Invention

The present invention generally relates to voice and data communication systems. More particularly, this invention relates to wireless communication systems including formatting of data to be transmitted over an air interface at a high data rate.

2. Description of the Related Technology

The T-carrier system provides high rate digital transmission of data to customer premises. Originally, this system was designed for wired networks in order to enhance the quality of calls and better utilize the cable facilities. In particular, the T-carrier technology allowed telecommunication companies to increase the call carrying capacity while taking the advantage of unused transmission capacity of their existing wire pair facilities, as well as improving the transmission quality.

A first generation of T-carrier systems, called T1 (or Digital Signal Level 1, DS1), is a full duplex all-digital service. The digital stream is capable of carrying standard 64-Kb/s channels in which 24 channels are multiplexed to create an aggregate of 1.536 Mb/s. Time-Division Multiplexing (TDM) allows a channel to use one of the 24 timeslots. More specifically, the 24 channels are time-division multiplexed into a frame to be carried along the line. Each frame contains one sample of 8 bits from each of the channels. Added to this is a framing bit. This structure results in a frame of 193 bits. There are 8000 frames per second (due to the PCM on each channel), therefore a frame is 125 microseconds long. Adding the 8 Kb/s overhead (due to framing) to 1.536 Mb/s, yields an aggregate of 1.544 Mb/s. T1 usually employs AMI (Alternate Mark Inversion) coding in order to reduce the required bandwidth of 1.5 MHz by a factor of two. The transmission is byte-synchronous, i.e., timing for each channel is derived from the pulses that appear within the samples (8 bits in each sample). This timing keeps every thing in sequence. Although, T1 is generically 24 channels of 64 Kb/s data plus 8 Kb/s of overhead (sometimes called channelized service), the multiplexing equipment can be configured in a number of ways. For example, T1 can be used for a single channel of 1.536 Mb/s, two high-speed data channels at 384 Kb/s each, and a video channel at 768 Kb/s. In short, the T1 service does not have to be channelized into 24 timeslots. It can be any usable data stream required. Although T1 systems are generally treated as four-wire circuits, they can also support any other suitable medium such as fiber optics, digital microwave links, coax, etc. When the other media forms are used, the T-carrier is suitably taken from the transmission mode and converted back to the appropriate interface.

A T2 (DS2) service has a concept similar to T1, but with a data rate that is four times higher and some extra framing bits. This results in an aggregate of 6.312 Mb/s. Similarly a T3 digital link is composed of a serial combination of seven T2 links (and the required extra framing bits), resulting in a data rate of 44.736 Mb/s. The T3 service is utilized in high capacity services.

The E carrier services are the European equivalents of the T-carrier. Table 1 contrasts different T and E carrier systems in terms of their TDMA structure and data rates.

TABLE 1

T/E carrier systems

| T-Carrier | TDMA Structure | bits/125 μs | Data rate |
| --- | --- | --- | --- |
| DS0 | 8 bits/125 μsec | 8 b/125 μs | 64 Kb/s |
| T1, DS1 | 24 DS0 + 1 Framing bit = (24 × 8 + 1) bits/125 μsec | 193 b/125 μs | 1.544 Mb/s |
| T2, DS2 | 4 DS1 + 17 Framing bits = (4 × 193 + 17) bits/ 125 μsec | 789 b/125 μs | 6.312 Mb/s |
| T3, DS3 | 7 DS2 + 69 Framing bits = (7 × 789 + 69) bits/ 125 μsec | 5592 b/125 μs | 44.736 Mb/s |

| E-Carrier | TDMA Structure | Data Rate |
| --- | --- | --- |
| E0 | | 64 Kb/s |
| E1 | 30 E0 + Framing Bits | 2.048 Mb/s |
| E2 | 4 E1 + Framing Bits | 8.448 Mb/s |
| E3 | 4 E2 + Framing bits | 34.368 Mb/s |

Due to the considerable cost of wiring, line amplifiers etc., there has been an increasing need for wireless implementation of T/E-carrier technology. Initially, infrared laser-based T1/T2 systems were developed. The major concern was the fact that no licensing requirements were necessary, so that the system could be put into action as soon as the acquisition was made. In addition, the cost of implementation required no major tower, power equipment, cable entrances or other construction needs. Typical applications of such cordless T1/T2 links are digital PBX to PBX connection (using a quad T1) and video conferencing using a channel capacity of 6 Mb/s or four 1.544 Mb/s at compressed video standards. However the infrared laser technology has a number of disadvantages, such as limited range (up to 1.5 miles), concern over the use of a laser in an office environment, atmospheric disturbances, etc.

Recently, there has been a growing interest in implementing T-carrier systems using wireless microwave (point-to-point) radio links (e.g., Radio in the Local Loop or RLL). Such applications have been facilitated by use of spread spectrum technology and the recent release of the unlicensed ISM (Industrial, Scientific and Medical) bands by FCC. The latter overcomes the frequency coordination and licensing problems associated with microwave communications. These bands, which are at 900 MHz (902–928 MHz), 2.4 GHz (2400–2483.5 MHz) and 5.7 G Hz (5725–5850 MHz), are defined under section 245 of the part 15 of the FCC regulations.

There is an urgent need for wireless T/E technologies, especially for mountainous region extension, urban links between separate facilities, over-water extensions, site interconnections of cellular networks, building-to-building LAN extensions, PBX, FAX and data extensions, and community networks.

One limitation of conventional T/E carrier systems for synchronization between the transmitter and the receiver is that they use framing overhead bits of successive frames. In other words, the frames are sent sequentially to ensure synchronization in conventional T/E carrier systems. Furthermore, the initial T/E systems were used to reduce the number of voice frequency cable pairs needed for interconnecting telephone offices. Many of these links were short and analog cable systems had not proved economical. More importantly, there were technical complications associated with these initial T/E systems as they became more widely deployed. One major complication is that the speech coding used was inadequate for providing proper transmission quality to create long-distance circuits. To prevent this problem, the number of T systems in series had to be limited to three, which substantially complicated network provisioning and circuit planning.

In view of the foregoing, there is a need in the industry for a new method of implementing T/E systems which extends the coverage area in a wireless communication environment without the disadvantages of conventional methods. The new method and system should enable compensation for transmitting and receiving frequency variations, synchronization at the receiver and provision of a virtual signaling channel. This method and system should expand coverage areas while maintaining minimal channel inter-cell interference or congestion. Furthermore, such a system should be easy to install and maintain.

SUMMARY OF THE INVENTION

To overcome the above problems, the present invention provides a method which allows the synchronization between the transmitter and receiver of existing wireless carrier communication systems without the disadvantages of the prior art. The above-mentioned problems are solved by providing a frame and signaling controller system which provides synchronization at the receiver, a virtual signaling channel for system alarms and status for wireless carrier communication systems (such as T/E carriers) in frequency bands, such as the Industrial, Scientific and Medical (ISM) frequency bands. The ISM frequency bands allocated by the Federal Communications Commission (FCC) are spread across the frequency ranges of 902–928 MHz, 2400–2484 MHz, and 5725–5850 MHz. The frame and signaling controller system provides full duplex communications while maintaining proper signaling schemes for a variety of wireless communication systems, such as mobile systems employing Code Division Multiple Access (CDMA) in which a transmitted signal is spread over a band of frequencies much wider than the minimum bandwidth required to transmit the signal, Time Division Multiple Access (TDMA) where the users share the radio spectrum in the time domain, Frequency Division Multiple Access (FDMA) where a user is allocated at least one unique frequency for communication without interference with users in the same frequency spectrum, or similar technologies.

In accordance with one embodiment of the present invention, the frame and signaling controller system adds extra bits into the data stream to be transmitted in the ISM frequency bands. The frame and signaling controller system comprises two main subsystems: a framing circuit and a signaling controller (FCSC) at the transmitter and a deframer at the receiver. In one direction, called the forward link, the FCSC provides a structure to the data received from a transmitter elastic store and sends the finalized structure to the spreader for processing. After processing, this data in the form of frames is sent over the air interface in the ISM band frequencies. For synchronization reasons, the deframer at the receiver recognizes the framing bits added by the framer, strips the data stream of these bits and sends the data to a receiver elastic store. The frame and signaling controller system implements all these steps without affecting the initial structure of the data. More importantly, the frame and signaling controller system transmits the data transparently, without interference with the data modulation and control protocols.

In one embodiment of the present invention there is a virtual channel system for wireless, multi-channel signaling, comprising a framer receiving a multi-channel signal, comprising a framing circuit for a virtual channel, wherein the virtual channel communicates a plurality of frames, each frame comprising a plurality of bits, the bits including a plurality of overhead bits and a plurality of data bits, and wherein the framing circuit includes a timing logic circuit to provide clock signals for the insertion of at least the overhead bits into the frames, and a signaling controller capable of providing channel signals to the framing circuit, wherein a plurality of channel signals form a message for sending on the virtual channel; a wireless transmitting system converting the virtual channel bits into transmitted wireless signals; a wireless receiving system converting the wireless signals into the virtual channel bits; and a deframer receiving the virtual channel bits and forming the multi-channel signal.

In another embodiment of the present invention there is a framer for wireless, multi-channel signaling, comprising a framing circuit for a virtual channel, wherein the virtual channel communicates a plurality of frames, each frame comprising a plurality of bits, the bits including a plurality of overhead bits and a plurality of data bits, and wherein the framing circuit includes a timing logic circuit to provide clock signals for the insertion of at least the overhead bits into the frames; and a signaling controller capable of providing channel signals to the framing circuit, wherein a plurality of channel signals form a message for sending on the virtual channel.

In yet another embodiment of the present invention there is a deframer for wireless, multi-channel signaling, comprising a clock generator capable of decoding justification bits of a virtual channel, wherein the virtual channel communicates a plurality of frames, each frame comprising a plurality of bits, the bits including a plurality of overhead bits and a plurality of data bits, and wherein the overhead bits include at least one justification bit; a first shift register capable of storing received serial bits in the virtual channel; and a second shift register connected to the first register so as to receive bits in parallel from the first shift register, wherein the second shift register obtains clock signals from the clock generator.

BRIEF DESCRIPTION OF THE DRAWINGS

FIG. 3a is a diagram showing a structure of the frame used in the FCSC subsystem shown in FIG. 2.

FIG. 3b is a diagram showing exemplary frames in parallel on different channels as processed by the FCSC subsystem shown in FIG. 2.

DETAILED DESCRIPTION OF THE PREFERRED EMBODIMENT

The above and other aspects, features and advantages of the present invention will be better understood by referring to the following detailed description of the preferred embodiment, which should be read in conjunction with the accompanying drawings wherein like parts are designated with like numerals throughout.

The present invention provides a frame and signaling controller system for synchronization between the transmitter and receiver, compensation for transmitting and receiving frequency variations and provision of a virtual signaling channel for system alarms and status. The frame and signaling controller system comprises two main sub-systems: a framing circuit and signaling controller (FCSC) subsystem at the transmitter, and a deframer subsystem at the receiver. The FCSC subsystem receives data from an existing transmitter elastic store, provides a frame structure to this data by adding extra bits to the data stream, and sends it to a spreader for further processing. At the receiver, the deframer subsystem strips the extra bits from the data stream and sends it to a receiver elastic store for processing.

A detailed description of a frame and signaling controller system is provided below. As one embodiment of the present invention, it is not intended to limit the enumerated claims, but to serve as a particular example thereof.

Figure 1:
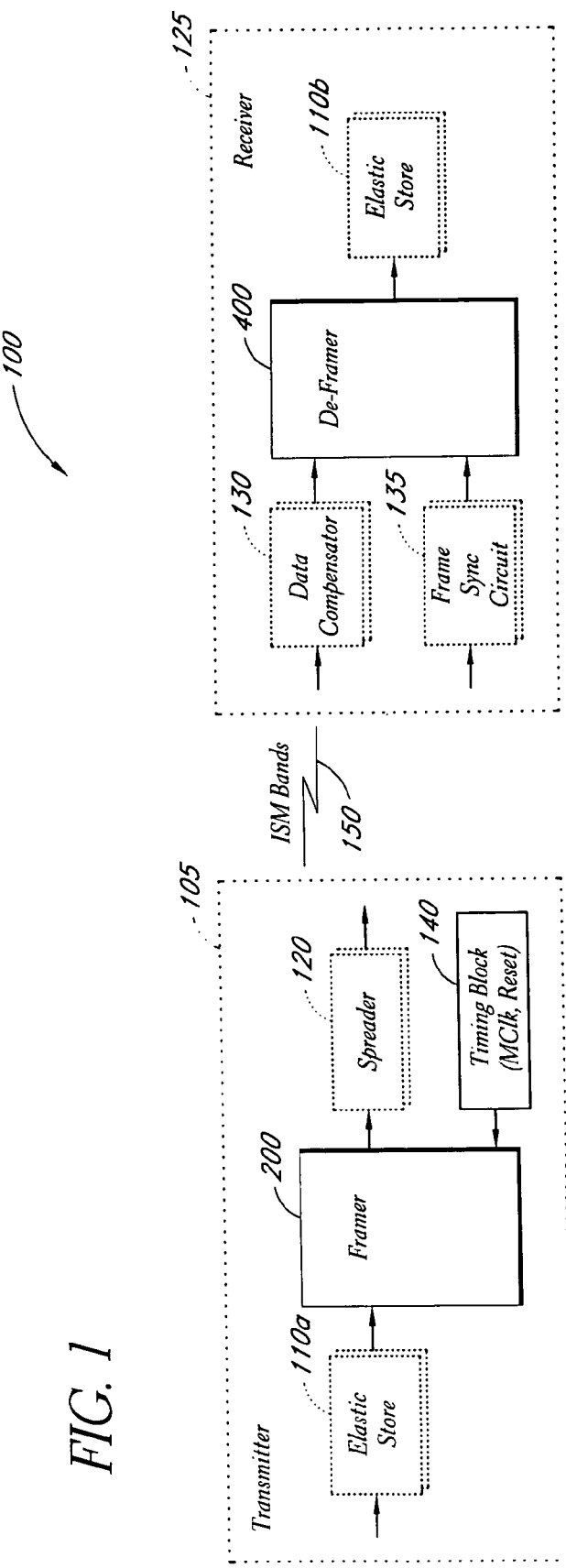
FIG. 1 is a functional block diagram depicting the location of the frame and signaling controller system in a wireless communication system.

FIG. 1 is a functional block diagram depicting the location of the frame and signaling controller system 200 and the deframer subsystem 400 in a wireless multimedia carrier system 100. The system 100 supports full-duplex voice and data communications.

In this embodiment, the system 100 comprises a framing circuit and signaling controller (FCSC) subsystem or framer 200 and a deframer subsystem or deframer 400. The FCSC subsystem 200 receives data from an elastic store 110a of a transmitter 105. The elastic store 110a is a shift register that provides a means of buffering data which may be written into its input at a slightly different rate than it is read from its output. The transmitter 105 consists of the FCSC subsystem 200, a transmitter elastic store 110a, a spreader 120 and other functional elements such as a timing block 140. Timing block 140 generates a Master Clock (MClk) and a Reset signal and connects to the elastic store 110a, the FCSC subsystem 200 and the spreader 120. The transmitter 105 is within the baseband portion of the wireless multimedia carrier system 100. The elastic store 110a delivers data to the FCSC subsystem 200. The FCSC subsystem 200 provides a frame structure to the data. This frame structure 300 is described in FIG. 3 below. The resulting framed data is then sent to a spreader 120 where it is further processed before being sent over an ISM link 150. Of course other types of links, such as personal communication services (PCS), National Information Infrastructure (NII) band, or cellular bands could be used in place of the ISM link.

At the receiver 125, the deframer subsystem 400 receives data from a data compensater 130 and a frame synchronizer circuit 135, strips the extra bits which were added to the data stream at the transmitter 105, and sends the resulting data to a receiver elastic store 110b for further processing. The data compensater 130 is a functional element of the receiver 125 that modifies the received data stream to compensate for phase variation. The frame synchronizer circuit 135 is a functional block within the receiver 125 that detects the start of a frame. The elastic store 1110b is a shift register that receives data that has the overhead bits stripped off.

Figure 2:
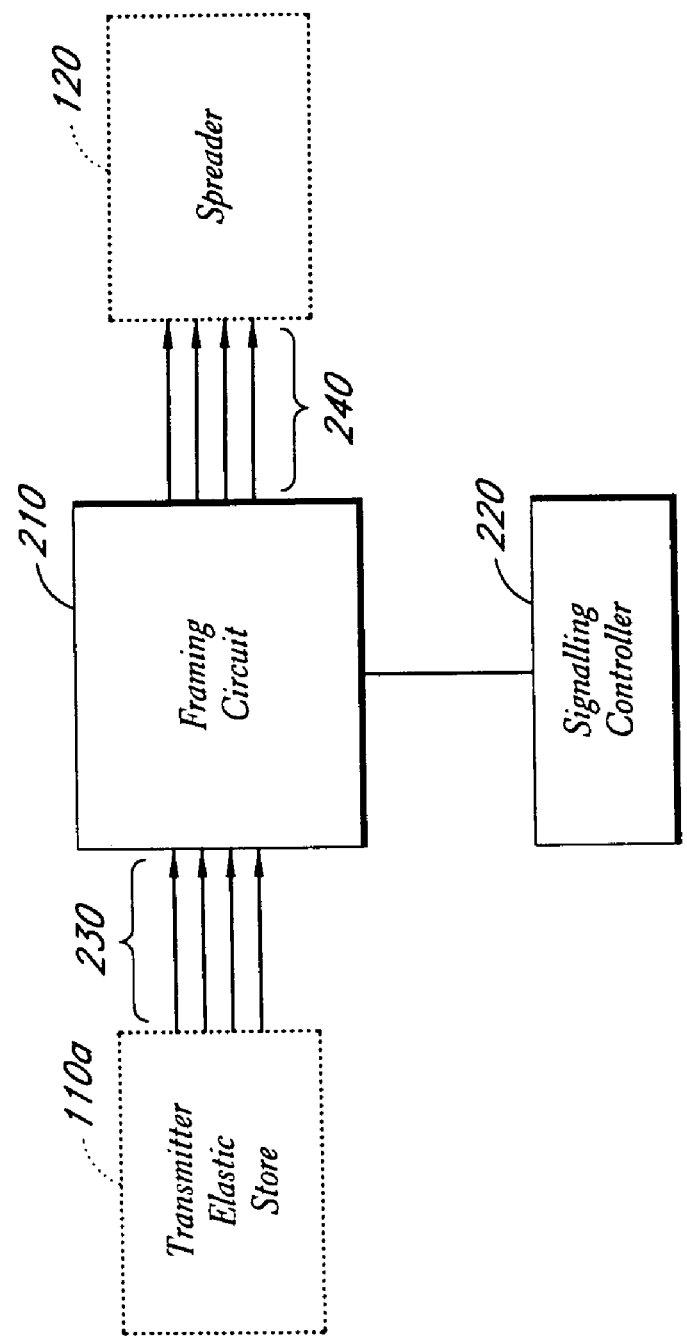
FIG. 2 is a functional block diagram of the Framing Circuit and Signaling Controller (FCSC) subsystem.

Referring now to FIG. 2, a functional block diagram of the framing circuit and signaling controller (FCSC) subsystem 200 used in the embodiment of FIG. 1 will be described. The FCSC subsystem 200 receives data on parallel channels 230 from the elastic store 110a. The FCSC subsystem 200 provides a frame structure to the data on each channel and sends it on parallel channels 240 to the spreader 120 for further processing. In this embodiment, the FCSC subsystem 200 comprises a framing circuit 210 receiving parallel inputs from the elastic store 110a (FIG. 1) and a signaling controller 220 interfacing with the framing circuit 210. The framing circuit 210 is responsible for defining the framing bits and providing a frame structure (FIG. 3a) to the data. The signaling controller 220 provides the signaling both locally and globally (at the system level). All the end-to-end signaling over the air interface in the ISM bands is mediated by the signaling controller 220.

Now referring to FIG. 3a, a structure of the frame 300 used by the framing circuit 210 of FIG. 2 is shown. The frame structure 300 comprises a preamble part 305, a signaling element or part 310, a justify part 315, a stuff part 320 and a data element 325. In this embodiment, the preamble part 305 consists of 2 bits. The preamble bits 305 are used to indicate the synchronization pulse at the receiver 125. The complete preamble 305 is equal to the number of channels multiplied by two bits per frame. In other embodiments, the number of channels is multiplied by two to get the total number of preamble bits. The signaling element 310 consists of one bit. The solution suggested for allocating signaling messages is based on Hamming distance; the messages are coded over 16 bits $\{S_0, \ldots, S_{15}\}$ and sent in the signaling bit of the frame for the first channel (channel 0: Enhanced Status Channel), whereas on the other channels a dummy signaling bit is transmitted. The justify part 315 consists of three bits to allow enough Hamming distance in coding the meaning of the stuffing bit. The justify bits 315 are used to indicate whether or not a stuffing bit exists. The justify bits are noted as follows:

$$J\frac{\text{Channel\_number}}{\text{Bit\_number}}.$$

The stuff part 320 consists of one bit. The stuffing bit 320 allows reading and writing of data without underflow or overflow of the elastic store 110a. The bit stuffing 320 technique preferably utilizes a pointer which indicates the current position in the buffer. Whether the stuffing bit 320 dynamically changes from a real data bit or not is indicated by the justify bits 315. The value of the stuff bit 320 is equal to either of the following:

Stuffing-bit-$pos$=1 if $(J_0^0 J_1^0 J_2^0)$=111

Stuffing-bit-$pos$=$D_0$ if $(J_0^0 J_1^0 J_2^0)$=000 where $D_0$ is the first data bit. The data element 325 is the data received from the elastic store 110a. In this embodiment, the length of the data 325 is assumed to be 193 bits. The data 325 can be either DS0 (up to 24 channels), T1 (up to 28 channels), E1 (up to 16 channels) or a single T3/E3 channel. Of course, the data element can be other lengths in other embodiments.

FIG. 3b illustrates the processing of the frame structure 300 over all the channels. In other words, it illustrates the above description. The preamble 305 is transmitted in parallel across all the channels (from 0 to N). The signaling bit 310 contains the signaling message on the first channel (channel 0) and a dummy signaling bit on the other channels. The justify bits 315 define the stuffing bit position 320. The value of the stuffing bit 320 varies depending on the value of the justify bits 315. In the case where the justify bits value is equal to 111, the stuff bit value is one. However, if the justify bits value is equal to 000, the stuff bit value is the first data bit.

Figure 4:
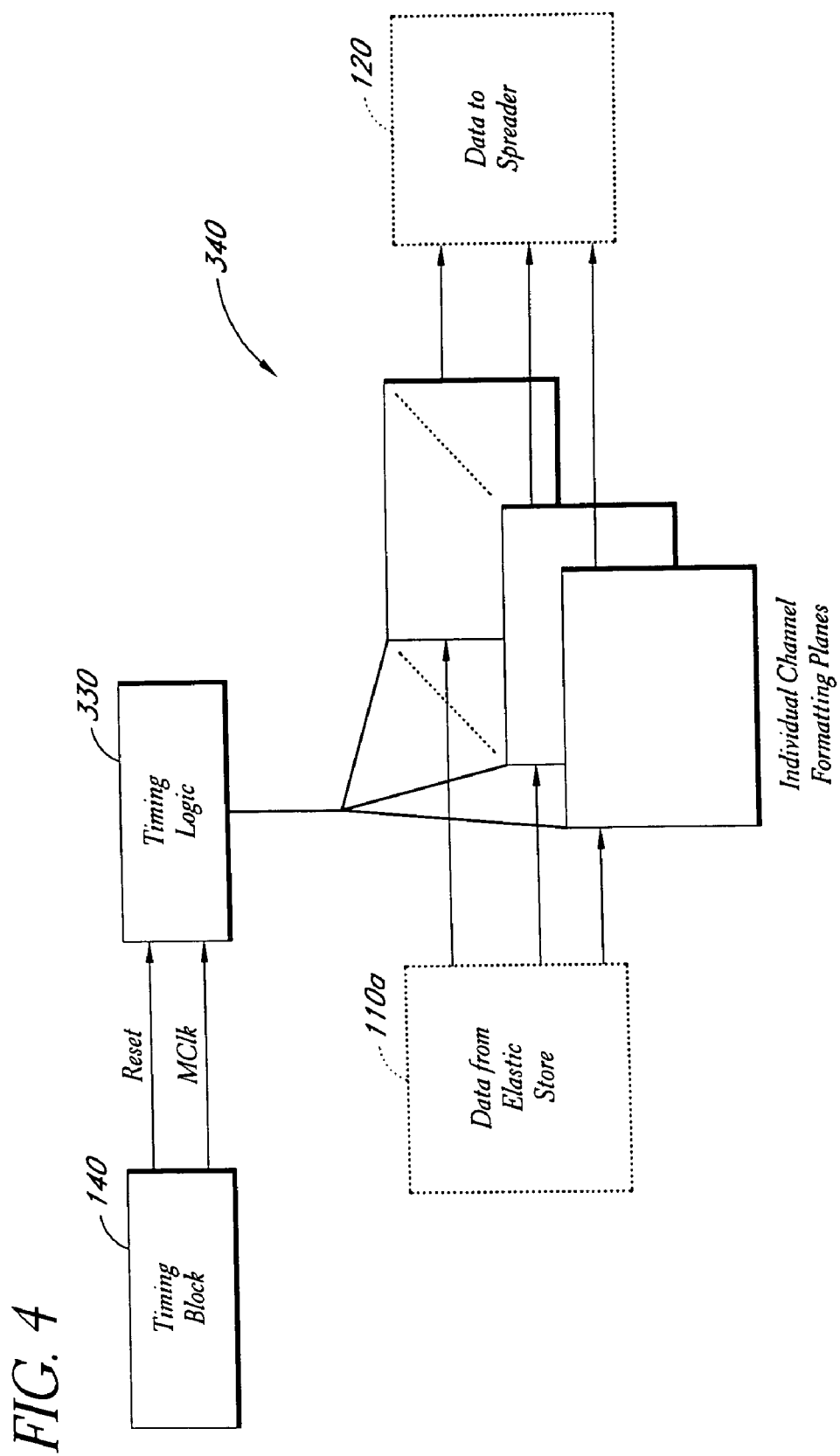
FIG. 4 is a block diagram showing the synchronous and parallel framing aspect of the FCSC subsystem shown in FIG. 2.

FIG. 4 illustrates the synchronous framing aspect of the FCSC subsystem 200. The channel frames are constructed synchronously from a common timing logic 330. The timing logic 330 provides to each channel framing plane 340 the clock signals for the insertion of the framing bits. The framing bits consist of the preamble bits, the signaling bit, the justify bits and the stuffing bits. The timing logic block 330 consists of a frame pointer counter corresponding to the length of the frame (or packet), e.g., 193 for a T-carrier system, and multiple decode circuits. The frame pointer counter indicates the current position within the frame. The multiple decode circuits indicate the correct time to switch between different types of overhead bits. The inputs to the timing logic block 330 consist of a series of clock signals that are generated by the transmit timing block 140.

Figure 5:
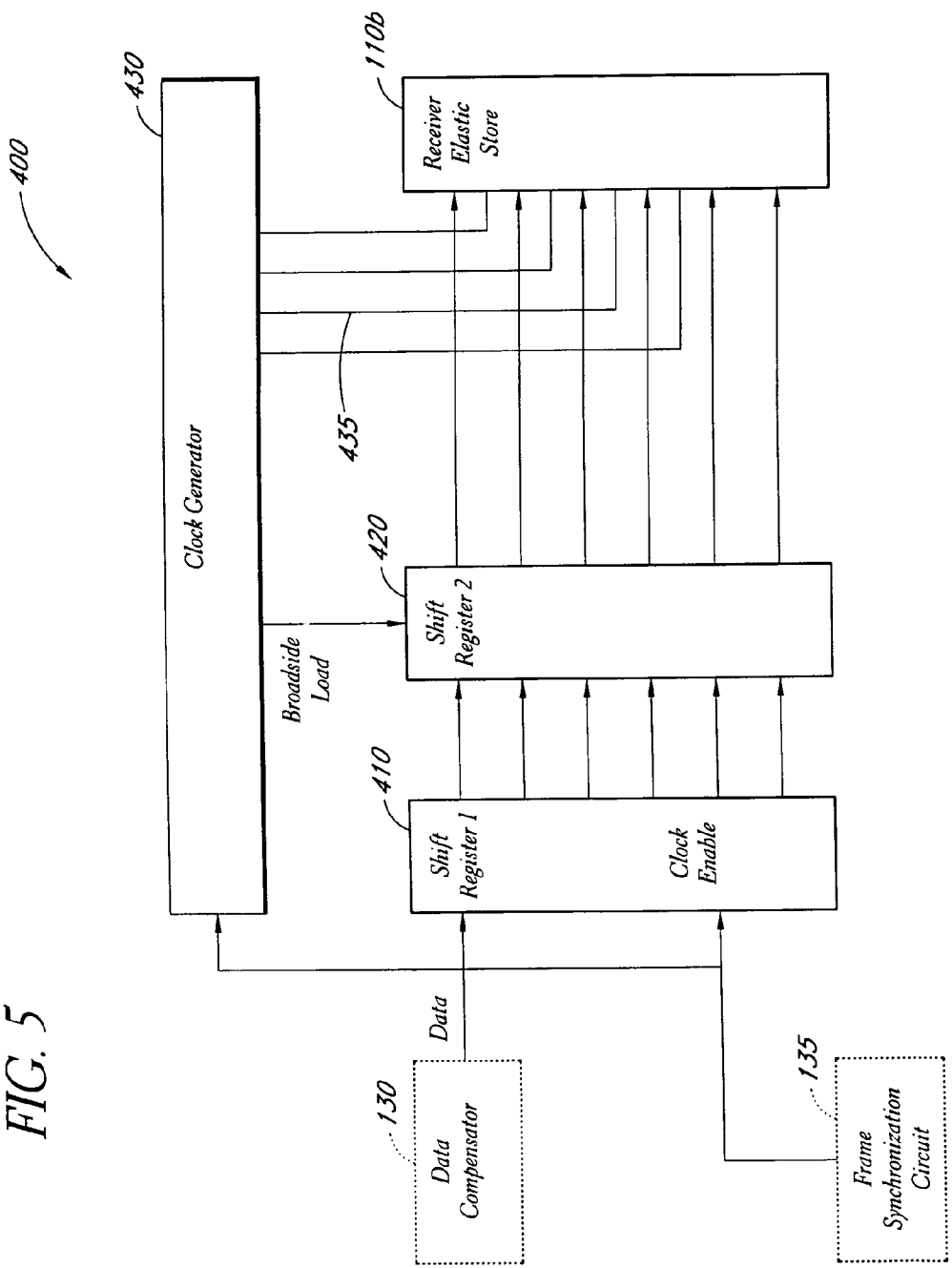
FIG. 5 is a block diagram of the deframer subsystem used in the system described in FIG. 1.

Referring now to FIG. 5, a functional block diagram of the deframer subsystem 400 used in the embodiment of FIG. 1 is shown. The deframer subsystem 400 accepts data from the data compensater 130 described in FIG. 1 and a clock enable signal from the frame synchronizer circuit block 135. The deframer subsystem 400 comprises two shift registers 410 and 420 and a clock generator 430.

Upon receipt of the preamble sync, a counter (chip_counter) starts to count the Master Clock (MClk) cycles. Every 28 MClk cycles, the frame pointer counter is incremented and a secondary counter is initiated. This secondary counter generates three clocks every 28 MClk cycles. These three clocks are used to time the sequence of events involved in the de-stuffing process.

The shift register 410 has as inputs data from the data compensater 130 and a clock enable signal sent by a preamble detection circuit within the frame synchronizer circuit 135. The shift register 410 accepts the inputted data in a serial format and outputs it in a parallel format to a shift register 420. The shift register 420 buffers the data received from the shift register 410 for a DClck (data clock) cycle. In a system utilizing 28 channels, for example, a Broadside Load signal is sent to shift register 420 when the chip_counter reaches 14. The data clock cycle begins with the Broadside Load signal. Therefore, the shift register's content is constant throughout the DClck cycle. The clock generator 430 generates the associated clocks to clock the data via clock lines 435 to the elastic store 110b. In other words, the clock generator 430 decodes the justification bits, putting the stuffing bit into the elastic store when the justification bits indicate the stuff bit is data, and ignores the bit and suppresses the write clock to the elastic store when the justification bits indicate the stuff bit is not data.

Figure 6A:
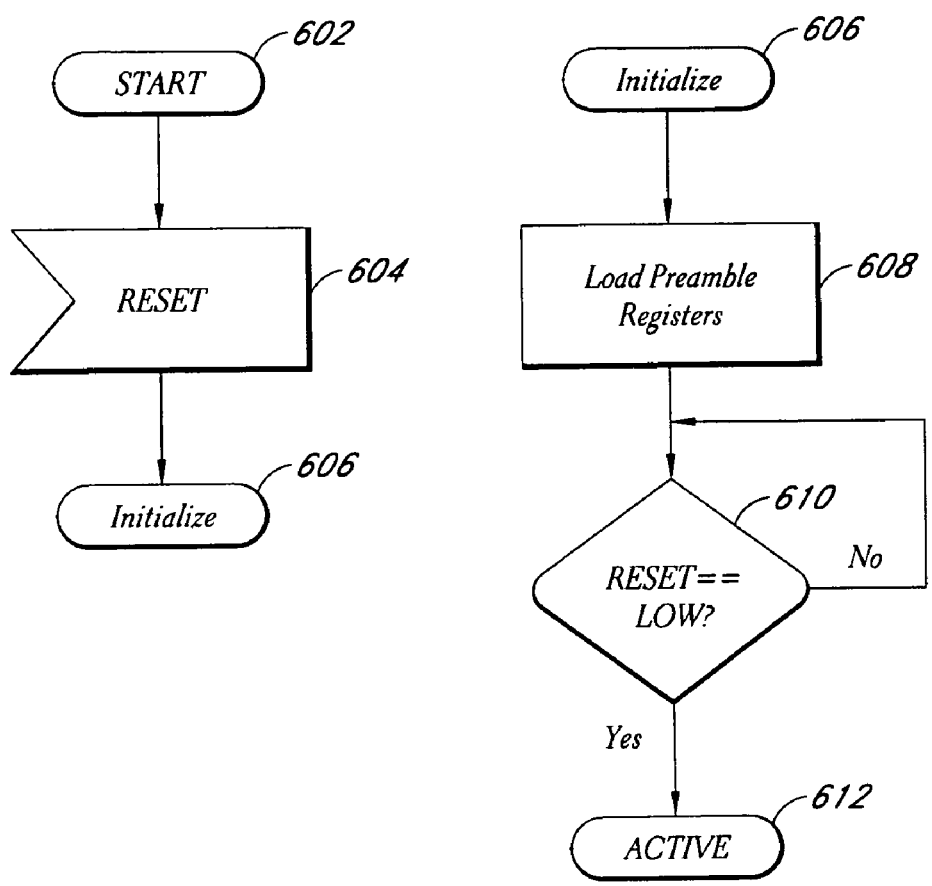
FIGS. 6a, 6b and 6c are flow charts that describe the operational flow of the FCSC subsystem shown in FIG. 2.
Figure 6B:
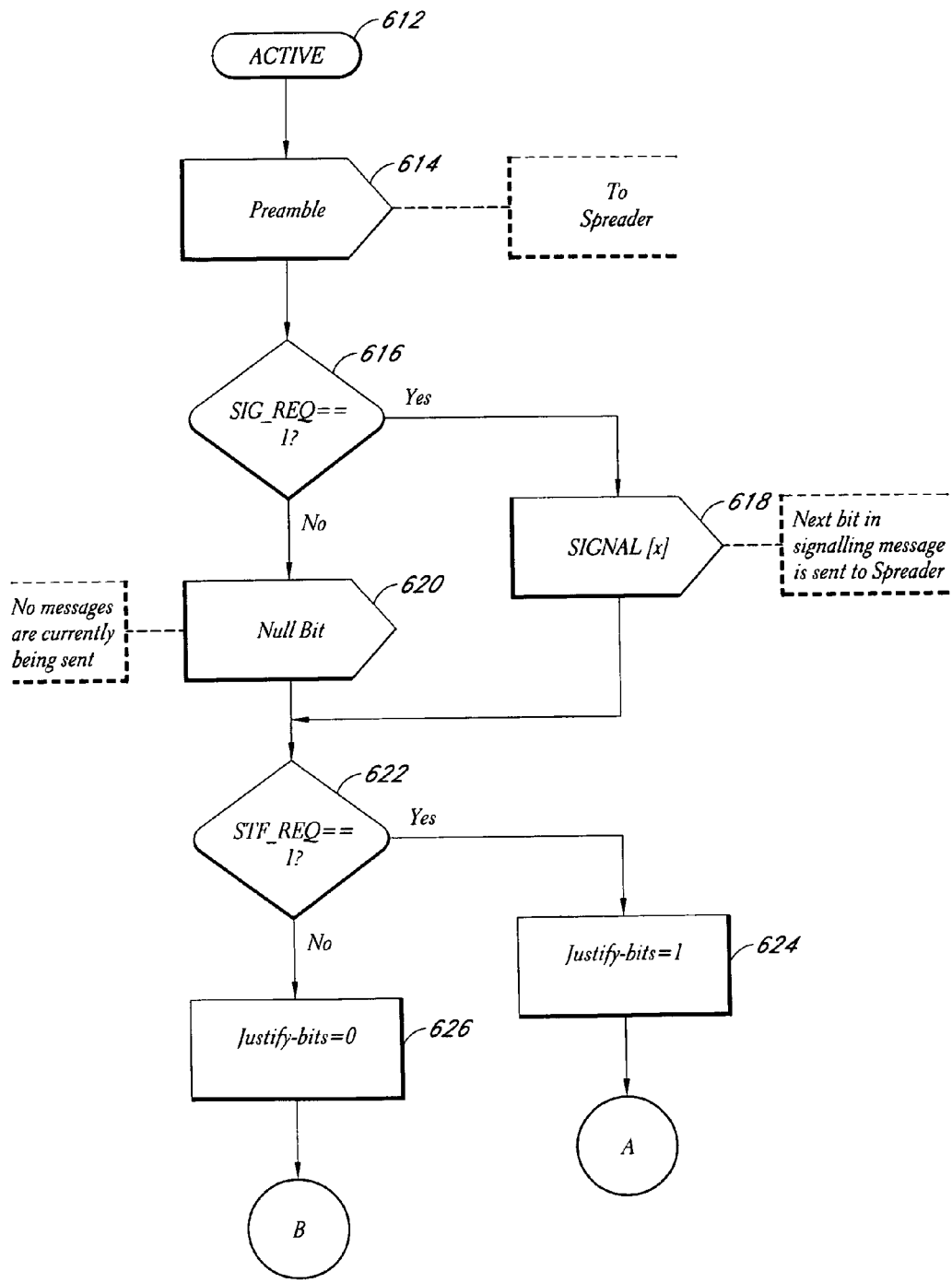
Figure 6C:
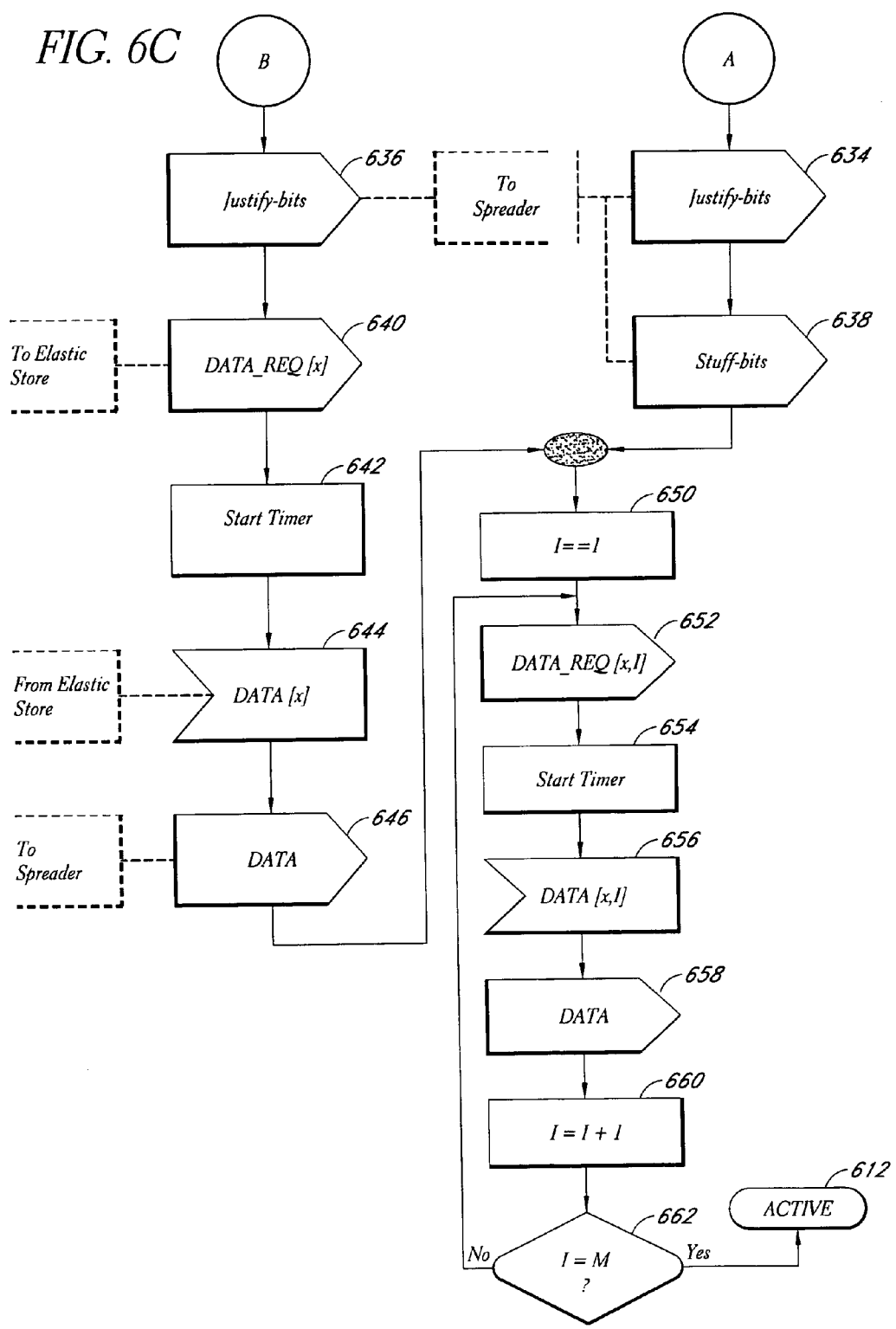

In accordance with this embodiment, FIGS. 6a, 6b and 6c illustrate the processing of the data in the frame and signaling controller subsystem 200 described in FIG. 2. The inputs can be divided into three types, namely inputs from the elastic store 110a, inputs from the signaling controller 220, and inputs from the timing block 140 (FIG. 1) in addition to various clocks.

The elastic store 110a sends a Data[N:0] signal and a STF_REQ [N:0] signal to the framing circuit 210. The Data [N:0] signal represents the payload data to be transmitted over the channels varying from 0 to N. The STF_REQ [N:0] signal is the stuffing request sent if the elastic store 110a begins to underflow. At the start transition 602 of the framing circuit 210 (FIG. 2), the RESET signal is received from the timing block 140 at state 604 and the Initialize state 606 is entered. Once in the Initialize state 606, the preamble, which is constructed from a Barker Code sequence, is loaded into a set of preamble registers that are part of the framing circuit 210 at state 608. In a system utilizing 28 channels, the preamble register set is preferably implemented by a 56 bit shift register (two bits per frame times 28 channels). Based on the value of the RESET signal as determined at decision state 610, an Active state 612 is entered if RESET is low. Any subsequent RESET re-loads the preamble registers (loading the registers occupies one transmit clock cycle, during which RESET must be held HIGH). Moving to FIG. 6b at the Active state 612, a Preamble signal 614 is sent to the spreader 120 and a decision is made at decision state 616 depending on the value of SIG_REQ signal sent from the signaling controller 220. If the SIG_REQ is high, the next bit in the signaling message is sent at state 618 to the spreader 120. Otherwise if SIG_REQ is low, as determined at decision state 616, no messages are sent and a null bit is provided at state 620. Additionally, if a STF_REQ signal (this signal is sent by the elastic store 110a when it begins to underflow) is high as determined at decision state 622, the justify bits 315 are set to one at state 624; otherwise the justify bits are set to zero at state 626.

Continuing on FIG. 6c, the justify bits set at either state 624 or 626 are sent to the spreader 120 at state 634 or state 636, respectively. Upon receipt of the STF_REQ signal from the elastic store 110a, the framing circuit 210 transmits a Stuff bit 320 at the next available stuffing opportunity. When the justify bits 315 are set to '111', a stuff bit 320 is sent in the current frame at state 638. When the justify bits 315 are set to '000', a DATA_REQ[x], where X is a channel number, is sent to the elastic store 10a at state 640 and a timer is started at state 642. Proceeding to state 644, the elastic store 110a has a fixed time (¾ of a transmit clock cycle) to send the DATA[x] signal containing the first bit of the data element 325 (FIG. 3a) to the framing circuit 210, in which case this data signal is sent then to the spreader 120 at state 646. In a system utilizing 28 channels, the transmit clock cycle is equal to 28 times the Master Clock (MClk) rate, which is 20 nanoseconds in one embodiment. Thus the fixed time is 420 nanoseconds in this example.

At the completion of either state 646, where a data bit is sent to the spreader 120, or state 638, wherein a stuff bit is sent to the spreader, processing continues at state 650 wherein a variable I is set to the value of one. Moving to state 652, a DATA_REQ[x,I] is sent to the elastic store 110a to retrieve the $I^{th}$ bit of the store for channel [x]. Continuing at state 654, the timer described in conjunction with states 642 and 644 is started. Proceeding to state 656, DATA[x,I] is received from the elastic store 110a within the fixed time previously described above. The received data is sent to the spreader 120 at state 658. Advancing to state 660, the variable I is incremented by one to point to the next data bit in the current frame of Channel [x]. Moving to a decision state 662, a determination is made whether all the bits of the data element 325 of the current frame has been processed, i.e., is I equal to M, where M is selected so as to process all the bits in the data element 325 for the channel or packet length used in the system 100. If so, the current frame is completed and processing continues at the Active state on FIG. 6b. However, if not all of the bits of data element 325 have been processed, as determined at state 662, processing moves back to 652 to request the next bit.

The signaling bit 310 (FIG. 3*a*) is generally used for signaling activity at three main levels. The first level of signaling occurs between functional elements within the Transmitter 105 (FIG. 1) or Receiver 125 systems. The second level of signaling occurs at the system level (e.g., between the Transmitter 105 and the Receiver 125). The third level of signaling occurs at the end-to-end level over the air link 150. For example, Channel 0 is used to carry the signaling information, while all other channels may use a dummy signaling bit (e.g., set to "1") Hence, if the system operator desires to inquire about the overflow/underflow status of the Elastic Store 110*a*, a signaling bit is used to request such status information from the Elastic Store 110*a* with the system microcontroller (not shown). This arrangement provides an adequate signaling rate for the types of messages which need to be sent. Typically, the message sent across the signaling bus (i.e., Channel 0) comprises a message preamble (e.g., 3 bits), a channel number (e.g., 5 bits), a message category (e.g., 3 bits), a message type (e.g., 5 bits), and other similar information elements if applicable. Although any channel may be used as a signaling bus, in this embodiment, Channel 0 is designated as the signaling bus. There are three main categories of messages: Call Establishment, Call Clearing, and Other Messages. For Call Establishment category, the message type includes set-up request, set-up acknowledgment, connect, and connect acknowledgment. For Call Clearing category, the message type includes release, release complete, restart, and restart acknowledgment. For Other Messages category, the message type includes status request (status and alarms), notify (status and alarms), and information. Accordingly, a typical message may look as follows:

Message=Preamble+Channel_Number+Category+Message_Type+IE where Preamble represents the preamble bits, Channel_Number represents the channel number being used, Category represents the message category (e.g., call establishment), Message_Type represents the message type (e.g., set-up acknowledgment), and IE represents other information elements being sent. In this embodiment, bits 5–7 are designated for IE. Five bits are designated to represent the channel number to allow a maximum number of 32 channels. In asynchronous communication, the message preamble alerts the receiving unit that a message is being transmitted. In a message block, bits 13–15 are designated as the message preamble. The bits 13–15 are set to "111" to indicate that a message is being transmitted. If no message is being sent, then the signaling bit in the frame is set to "0". The signaling is carried out on the virtual channel (e.g., Channel 0) thereby requiring a channel number (especially in case of errors over one specific channel). Bits 8–12 are designated as the channel number. When the bits 8–12 are set to "11111," a global alarm is indicated to all channels. A global alarm may be recognized by all functional elements in the system 100 (FIG. 1). A specially designated system microcontroller (e.g., a Hitachi H8/3048) typically manages and controls the occurrence of a global alarm. The remaining bits are designated for the message data of the signal.

In one embodiment, the signaling controller 220 (FIG. 2) receives a 16-bit word from the system microcontroller with a SIG_REQ signal. When held in the logical high state, the SIG_REQ signal indicates the presence of a valid message. The 16-bit word is transmitted one bit at a time across 16 consecutive frames on Channel 0. Additionally, a Clear-to-Send signal (SIG_CTS) is disabled while the message is being transmitted. If the SIG_REQ signal is maintained in the high state after the message is transmitted, then the 16-bit word currently present on the signaling bus is immediately re-transmitted. Otherwise, when SIG_CTS signal is enabled at the end of a message transmission, the signaling subcontroller 220 waits for the next SIG_REQ signal transition. If the SIG_REQ signal is held low then null data (e.g., one or more zero bits) is transmitted at the signaling bit position. Hence, for a 16-bit channel, the signaling message is $\{S_0, S_1, \ldots, S_{15}\}$ on the first channel (Channel 0). On the other channels, dummy signaling bits of 1's are typically transmitted.

The FCSC subsystem 200, the deframer subsystem 400 and the frame structure 300 provides several advantages as follows:

a. efficiency;
b. high data rate transmission;
c. re-usability;
d. ability to transport data transparently to its content, format, protocol, pattern and rate. In other words, without having to decode the input data stream;
e. maintaining of synchronization between the transmitter and receiver despite variations in the frequency of local oscillators;
f. provision of end-to-end signaling for control and diagnostic reasons;
g. a method of distributing the signal processing functions to operate in parallel;
h. a method of encapsulating the data to provide speed-efficient phase, frequency and time-delay synchronization capability;
i. centralized control of all transceiver functions (signaling both end-to-end and intra-device);
j. compact, low cost design; and
k. intelligent.

In view of the foregoing, it will be appreciated that the present invention overcomes the longstanding need for a simpler synchronization at the receiver, transparently transmitting data at a high data rate and expanding coverage areas of wireless carrier systems without the disadvantages of conventional methods. The present invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A virtual channel system for wireless, multi-channel signaling, comprising:

a framer receiving a multiple channel signal, comprising:
a framing circuit configured to frame the received multiple channel signal to form channel frames that each have a plurality of overhead bits and a plurality of data bits including data from one of the received channels, and to incorporate a virtual channel which is communicated via a plurality of channel frames, the framing circuit including a timing logic circuit to provide clock signals for the insertion of at least the overhead bits into the channel frames, and
a signaling controller configured to provide virtual channel signals to the framing circuit, wherein a plurality of virtual channel signals form a message for sending on the virtual channel;

a wireless transmitting system converting the overhead and data bits of the channel frames into transmitted wireless signals;

a wireless receiving system converting the transmitted wireless signals back into the channel frames; and a deframer receiving the channel frames, extracting the virtual channel signals therefrom, and forming the multiple channel signals as received by the framer.

2. The virtual channel system of claim 1, wherein each of the received multiple channels contains preexisting overhead bits, and the preexisting overhead bits are included in the multiple channel signal formed by the deframer.

3. The virtual channel system of claim 2, wherein the virtual channel comprises a signaling part of the overhead bits.

4. The virtual channel system of claim 3, wherein the signaling part communicates virtual channel signals over a first channel of the wireless multiple channel signal.

5. A framer receiving multiple source-channel signals for wireless, multiple received-channel signaling, comprising:

a framing circuit configured to form a virtual channel message within a plurality of source-channel frames to be conveyed via a virtual channel, wherein each source-channel frame comprises a plurality of overhead bits and a plurality of data bits, the plurality of data bits of each source-channel frame includes data from a received source channel, and the framing circuit includes a timing logic circuit to provide clock signals for the insertion of at least the overhead bits into the source-channel frames; and a signaling controller configured to provide, to the framing circuit, a plurality of virtual channel bits that form the virtual channel message to be conveyed via the virtual channel.

6. The framer of claim 5, wherein the virtual-channel message is an intrasystem signaling message that conveys system information between circuits separated by a wireless link.

7. The framer of claim 5, wherein the overhead bits include a preamble part, a signaling part, a justify part and a stuff part.

8. The framer of claim 7, wherein the justify and stuff parts permit adjusting the number of bits conveyed over a wireless link for each data synchronization between a wireless transmitter and a wireless receiver.

9. The framer of claim 8, wherein the signaling part is only valid in source-channel frames of one of the received multiple channels in the multiple channel signal.

10. The framer of claim 9, wherein the valid channel is selected to be channel zero.

11. The framer of claim 7, wherein all virtual channel bits are located in the signaling part.

12. The framer of claim 5, wherein the framing circuit is further configured to append a header to data frames from each of the received multiple channels, and the data frames from each of the received multiple channels are otherwise configured as they are received from each channel.

13. The framer of claim 12, wherein the header includes a preamble part, a signaling part, a justify part and a stuff part.

14. The framer of claim 5, wherein the virtual channel is incorporated in source-channel frames irrespective of decoding of any of the received multiple channels.

15. The framer of claim 5, wherein the source-channel frames are conveyed to a spreader for wireless spread-spectrum signaling.

16. The framer of claim 5, further comprising an elastic store configured to receive the multiple source-channel signals at a receive rate and pass the data to the framing circuit at a rate differing from the receive rate.

17. The framer of claim 5, wherein:

the framing circuit is further configured to add a virtual channel signaling bit to each source-channel frame, signaling bits associated with one channel form a virtual channel message, and signaling bits associated with another channel are not part of any message.

18. The framer of claim 5, further comprising a shift register configured to store preamble bits from at least one source-channel frame of each of the multiple source-channel signals.

19. The framer of claim 18, wherein the number of the stored preamble bits depends upon the number of the received source-channels.

20. A deframer for wireless, multiple-channel signaling, comprising:

a clock generator capable of decoding justification bits and virtual channel message bits from source-channel frames which each have a plurality of overhead bits, including at least one justification bit, and a plurality of data bits which convey information of only one source channel;

a first shift register capable of storing received serial bits of the source-channel frames which include the virtual channel message bits; and a second shift register connected to the first register so as to receive bits in parallel from the first shift register, wherein the second shift register obtains clock signals from the clock generator.

21. The deframer of claim 20, wherein the first shift register receives serial bits from a data compensater.

22. The deframer of claim 20, wherein the first shift register receives a clock enable signal from a frame synchronization circuit.

23. The deframer of claim 20, wherein the second shift register provides, in parallel, data from a multiplicity of received channels to a receive elastic store.

24. A deframer for wireless, multi-channel signaling, comprising:

data-bit manipulation hardware configured to:

receive serial bits from multiple source-channel frames, and form the received serial bits into source-channel frames which each include a plurality of data bits from only one source channel;

a clock generator capable of decoding justification bits and virtual channel message bits from overhead bits of the source-channel frames; and a source-channel frame processor configured to:

extract the virtual channel message bits from a plurality of source-channel frames, form a virtual channel message from the virtual channel message bits, and remove overhead bits including the at least one justification bit from each source-channel frame to produce output channel frames corresponding to each source channel, whereby the output channel frames corresponding to each source channel retain data only from the source channel, and one or more framing overhead bits.

25. A method of framing and deframing in wireless multiple channel communication, the method comprising:
- receiving in parallel each channel of a multiple channel signal on a corresponding parallel signal path;
- generating framed data by appending overhead bits to the received multiple channel signal, the overhead bits associated with one of the channels including bits indicative of a message communicated on a virtual channel;
- modulating the framed data;
- transmitting the modulated framed data over a wireless communication link to a remote location;
- receiving at the remote location the modulated frame data;
- demodulating the modulated frame data; and
- removing the appended overhead bits to recover the multiple channel signal and the message communicated on the virtual channel.

26. The method of claim 25, wherein framed data represents data from one of the parallel signal paths.

27. The method of claim 26, wherein modulating the framed data comprises multiplexing the framed data from each of the parallel signal paths.

28. A method of framing multiple received signals, the method comprising:
- receiving, in parallel, each channel of a multiple channel signal on a corresponding parallel signal path; and
- appending overhead bits to data from each channel of the multiple channel signal to generate framed data in a number of framed data paths corresponding to the number of parallel signal paths, wherein a portion of the overhead bits comprise a virtual channel used to communicate messages used for signalling.

29. The method of claim 28, wherein the framed data on each of the framed data paths contain data from only one channel of the received multiple channel.

30. The method of claim 28, wherein the virtual channel data is valid in only one of the framed data paths.

31. The method of claim 28, wherein each channel of the multiple channel signal comprises channel frames and the act of appending overhead bits to data comprises appending data bits to channel frames.

32. The method of claim 28, wherein the signalling may occur between functional elements, at a system level, or at an end-to-end level.

33. The method of claim 28, wherein a portion of the overhead bits include a plurality of virtual channel bits that form a virtual channel message to be conveyed via the virtual channel.

34. The method of claim 33, wherein all the virtual channel bits are located in a signaling part of the overhead bits.

* * * * *